United States Patent
Praitis et al.

(10) Patent No.: US 6,594,697 B1
(45) Date of Patent: Jul. 15, 2003

(54) CLIENT SYSTEM HAVING ERROR PAGE ANALYSIS AND REPLACEMENT CAPABILITIES

(75) Inventors: Edward J. Praitis, Woodinville, WA (US); Scott Berkun, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/315,311

(22) Filed: May 20, 1999

(51) Int. Cl.[7] .................. G06F 15/173; G06F 15/16
(52) U.S. Cl. .................. 709/225; 709/229; 709/217; 709/219; 709/227; 714/4
(58) Field of Search .................. 709/217, 225, 709/229, 219, 224, 227; 714/4

(56) References Cited

U.S. PATENT DOCUMENTS

| | | | |
|---|---|---|---|
| 5,892,911 A | * | 4/1999 | Ishibashi et al. ............ 709/217 |
| 6,134,680 A | * | 10/2000 | Yeomans ..................... 709/219 |
| 6,202,087 B1 | * | 3/2001 | Gadish ........................ 709/206 |
| 6,269,460 B1 | * | 7/2001 | Snover ......................... 714/48 |
| 6,273,622 B1 | * | 8/2001 | Ben-David .................. 709/230 |
| 6,353,855 B1 | * | 3/2002 | Hendren, III ................ 709/220 |
| 6,421,715 B1 | * | 7/2002 | Chatterjee et al. .......... 709/219 |
| 6,421,740 B1 | * | 7/2002 | LeCroy ....................... 709/331 |
| 6,438,716 B1 | * | 8/2002 | Snover ......................... 714/57 |

* cited by examiner

Primary Examiner—Saleh Najjar
Assistant Examiner—Gregory Garrett Todd
(74) Attorney, Agent, or Firm—Merchant & Gould P.C.

(57) ABSTRACT

A computer-implemented browser on a client computer that requests electronic documents from a server computer over a computer network and displays friendly error messages or pages when an error is detected. The browser analyzes a response returned to the client computer from the server computer to determine whether an error occurred using information in the header of the response. If an error is detected, the browser analyzes the response to determine whether the response comprises a friendly error page. If not, the browser replaces the page returned in the response with a friendly page in that the browser displays a page separate from the page returned with the response. The replacement page is designed to be more user friendly.

11 Claims, 12 Drawing Sheets

CLIENT SYSTEM HAVING ERROR PAGE ANALYSIS AND REPLACEMENT CAPABILITIES

TECHNICAL FIELD

The present invention relates to computer software applications used to facilitate communications between separate computers. More specifically, the present invention relates to software programs, operating on a client computer, that interact with software located on server computers. Further still, the present invention relates to the ability of a client to manipulate a response received by the client from a server.

BACKGROUND OF THE INVENTION

The Internet is a distributed, worldwide computer network comprising computers belonging to various entities such as corporations, institutes of learning, and research organizations. The computers are connected by gateways that handle data transfer and conversion of messages from a sending network to the protocols used by a receiving network. In essence, the Internet is a collection of networks and gateways that use the TCP/IP suite of protocols. TCP/IP is an acronym for transport control protocol/interface program, a software protocol developed by the Department of Defense for communications between computers.

The worldwide web, i.e., web, is a specific Internet network using a specific Internet protocol, i.e., Hyper Text Transfer Protocol (HTTP). In general, protocols are a set of rules in a prearranged data format defining how two computers communicate on the computer network 54. Servers that use the web are known as web servers and typically provide many separate electronic files, displays or documents that are accessible to other web servers or web clients. These electronic files are identified by a uniform resource identifier (URI) or a uniform resource locator (URL).

In connection with wide area networks such as the Internet, operating systems having browsers are available for client computers to facilitate communication between the client computers and the server computer. Browsers in the operating system typically provide many functions, but most importantly they provide a graphical user interface that allows the user to both enter a request for an electronic web document from their personal computer (PC) and to view the response once it is returned.

The process of requesting web documents using the browser is generally referred to as either navigating or browsing the web since it is relatively simple to jump from one web server to the another. Often however, while browsing the web one of many possible errors occurs. Depending on the error, the client system may receive a response informing the client that an error occurred in processing the request. Typically the response will include status code information as to the kind of error but, unfortunately, the information is conveyed to the client system at a relatively low level and few users understand the error. Typically, the information is at such a low level that it is relatively obscure to most users, especially those users not familiar with the specific status codes as defined in the HTTP standards.

As an example, the error displayed message may only provide the information that "error 404" occurred. Receiving information that error 404 occurred does not inform an unsophisticated computer user of anything other than the fact that an error occurred. The user typically has no idea how to proceed or to resolve the issue. Even more experienced computer users may not understand all the highly technical error status codes or all the possible ways to resolve the issue. Unfortunately, receiving such an obscure error message tends to intimidate many computer users.

Some network servers have been proactive in attempting to prevent the display of such highly technical and relatively unfriendly error pages. These servers essentially provide, as part of their response, an electronic document or page display that informs the user of the error that occurred, the possible reasons why the error occurred and possible ways to fix or otherwise avoid the recurrence of the particular error. For example, a web server that receives a request for a particular file or page that is not present on the server may return a web page acknowledging that error 404 occurred, that the file is not found or not located on the server and that the user should double check their request to make sure an error was not made in the request.

Although these pages are much more helpful, servers are not required to provide such pages, and thus most servers do not. Moreover, it appears unreasonable to mandate that all servers comport to rigorous standards requiring these friendly pages. It is with respect to these and other considerations that the present invention has been made.

SUMMARY OF THE INVENTION

The present invention is related to an improved client system having the capability to analyze responses returned from various servers and determine whether an error occurred at the server. Another aspect of the present invention relates to client system having the capability of analyzing the full response associated with an error to thereby determine whether corrective action should be taken. When taken, corrective action preferably relates to replacing the error-response page returned from the server with a client generated page display. Additionally, the client system of the present invention is capable of generating and displaying the replacement page to the user.

The replacement page displayed by the client is designed to be more "user friendly" by providing useful information to the user related to which error occurred, why the error occurred and some possible solutions which may enable the user to either fix the error or avoid the error in the future. In another feature of the invention, the friendly error page also provides hyper-links to areas or sites on the World Wide Web that are considered to be safe, which are those web pages that are both accessible and returnable to the user without an error occurring.

A more complete appreciation of the present invention may be obtained from the accompanying drawings, which are briefly summarized below, from the following detailed description of the invention and from the appended claims.

DETAILED DESCRIPTION OF THE INVENTION

An embodiment of the present invention displays meaningful, i.e., friendly error messages by analyzing each response returned by the various servers and determining whether to display an electronic document or page returned by the server or to display a predetermined replacement page that is known to be friendly. The header of each response is analyzed for an error indicator such as specific code numbers indicating error conditions. When an error occurs, the length or size of the returned page is compared to a predetermined threshold size. If the returned page is smaller than the threshold size, then the returned page is assumed to be not friendly and is replaced with a friendly page previously stored in memory or created prior to display. In an embodiment, the replacement page is created by the browser. On the other hand, if the returned page is larger than the threshold size, the returned page is assumed to be a friendly error page and is displayed.

Alternatively, the response page is analyzed for other criteria or characteristics that indicate whether the page is friendly. For example, the response page may analyzed based on the number of hyperlinks or images in the page, the size and type of the page text or the type of software package used by the server computer in generating the response. For any of these measured properties, the threshold value is preferably set to prevent most if not all unfriendly error pages from being displayed while still allowing server generated friendly pages to be displayed.

The predetermined replacement page is preferably generated locally by the operating system having a browser and incorporates information from the requested address URL to provide a hyper-link to a safe page. Additionally, the browser of the operating system preferably displays the URL related to the error URL instead of the friendly page URL in the address bar portion of a browser display so that the user can see which address was requested when the error occurred.

Exemplary Operating Environment

Figure 1:
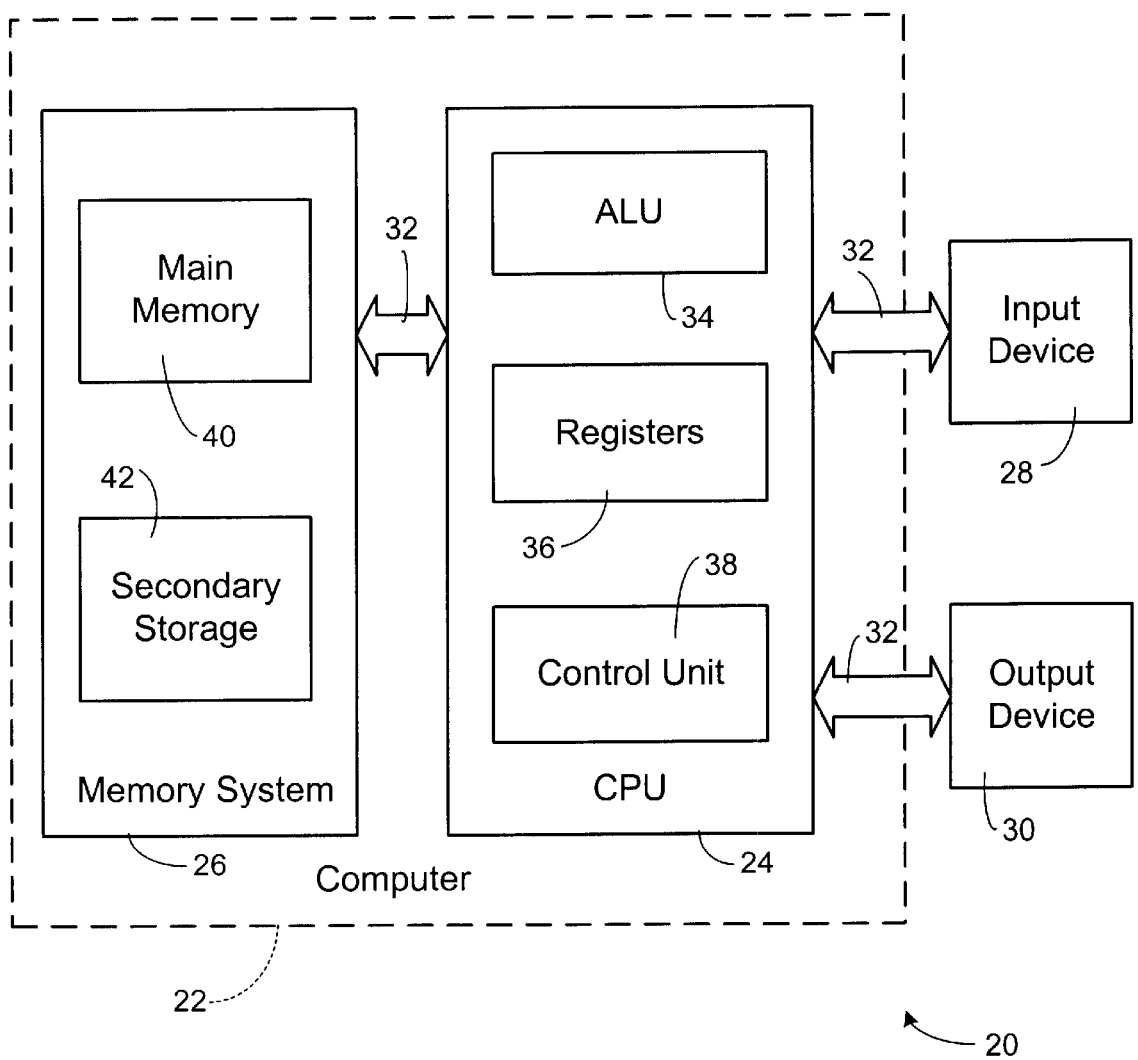
FIG. 1 is a block diagram of a computer system that may be used to implement a method and apparatus embodying the improved browser of the present invention.

FIG. 1 and the following discussion under this subheading are intended to provide a brief general description of a suitable computing environment in which the invention may be implemented. Although, not required, the invention is described in the general context of computer executable instructions such as program modules being executed by a personal computer (PC). Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor based or programmable consumer electronics, network PCs, mini computers, main frame computers and the like. The invention may also be practiced in distributed computing environments where tasks are performed by remote processing devices that are linked through a communications network in a distributed computing environment, program modules may be located in both local and remote memory storage devices.

An exemplary system for implementing the invention is shown in FIG. 1. The system comprises a computer system 20 incorporating a computer 22 in the form of a PC that comprises at least one central processing unit (CPU) 24, a memory system 26, an input device 28, and an output device 30. These elements are coupled by at least one system bus 32.

The CPU 24 is of familiar design and includes an Arithmetic Logic Unit (ALU) 34 for performing computations, a collection of registers 36 for temporary storage of data and instructions, and a control unit 38 for controlling operation of the system 20. The CPU 24 may be a microprocessor having any of a variety of architectures including, but not limited to those architectures currently produced by Intel, Cyrix, AMD, IBM, DEC and Motorola.

The system memory 26 comprises a main memory 40, in the form of media such as random access memory (RAM) and read only memory (ROM), and a secondary storage 42 in the form of long term storage mediums such as hard disks, floppy disks, tape, compact disks (CDs), flash memory, etc. and other devices that store data using electrical, magnetic, optical or other recording media. The main memory 40 may also comprise video display memory for displaying images through the output device 30, such as a display device. The memory 26 can comprise a variety of alternative components having a variety of storage capacities such as magnetic cassettes memory cards, video digital disks Bernoulli cartridges, random access memories, read only memories and the like may also be used in the exemplary operating environment. Memory devices within the memory system 26 and their associated computer readable media provide storage of computer readable instructions, data structures, program modules and other data for the computer system 22.

The system bus 32 may be any of several types of bus structures including a memory bus or memory controller, a peripheral bus, and a local bus using any of a variety of bus architectures.

The input and output devices 28 and 30 are also familiar. The input device 28 can comprise a keyboard, a mouse, a microphone, etc. The output devices 30 can comprise a display, a printer, a speaker, etc. Some devices, such as a network interface or a modem can be used as input and/or output devices. The input and output devices 28 and 30 are connected to the computer 22 through system buses 32.

The computer system 20 further comprises an operating system. The operating system comprises a set of software commands that controls the operation of the computer system and the allocation of resources. Preferably, the operating system employs a graphical user interface where the display output of an application program is presented on the display device 30. Exemplary operating systems include Microsoft Windows 95, Microsoft Windows 98 and Microsoft Windows NT operating system. Additionally, the operating system includes a browser module and networking software having capabilities of interacting with other computers over a computer network.

Additionally, the computer system 20 may comprise an application program wherein the application program is the set of software that performs a task desired by the user, using computer resources made available through the operating system. Both are resident in the memory system 26.

Figure 2:
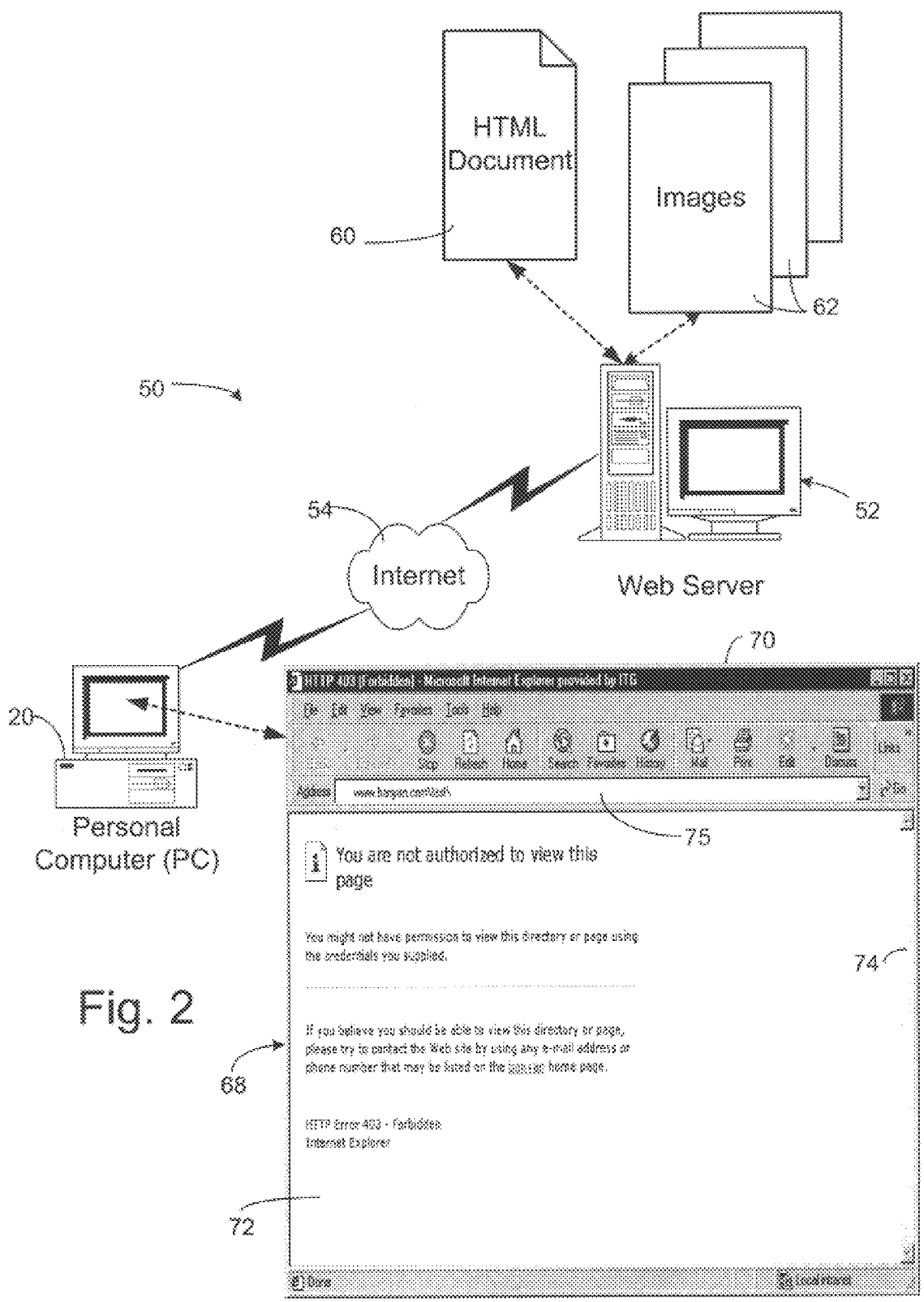
FIG. 2 is a block diagram of the computer system shown in FIG. 1 connected to a server computer through a computer network.

The embodiments of the invention described herein are implemented as logical operations in a distributed processing system or network 50 having a client computer system 20 and at least one network server computer system 52, as shown in FIG. 2. The logical operations of the present invention are implemented (1) as a sequence of computer implemented steps running on the computing system 20 and (2) as interconnected machine modules within the computing network 50. Accordingly, the logical operations executed by the browser portion of the operating system of the present invention as described herein are referred to alternatively as operations, steps or modules.

Client-Server Overview

In the client-server environment 50 of an illustrated embodiment of the invention shown in FIG. 2, the client computer system 20 runs a browser module (hereinafter browser) as part of the operating system on the computer 20 for retrieving or browsing electronic documents from a remote server computer 52. The illustrated remote computer network 54 is the Internet, which is described in the background and summary of the invention above. In the illustrated client-server environment 50 the client computer system 20 connects to the computer network 54 over a telephone line with a modem (not shown) or other physical connections alternatively can be used such as a network interface, an ISD1, T1 or the like high speed telephone line, a television cable, a satellite link, an optical fiber network, an Ethernet or local area network technology wire and adapter card, radio or optical transmission devices, etc. The invention can alternatively be embodied in a client-server environment for other public or private computer networks, such as computer network of a commercial on line service or an internal corporate local area network (LAN) or like computer networks.

An electronic document 60 resides at a remote computer 52 also referred to as a web server connected to the computer network 54. The illustrated electronic document 60 conforms with HTML standards, and may include extensions and enhancements of HTML standards. In conformance with HTML the electronic document 60 can incorporate other additional information content 62, such as images, audio video executable programs, etc., hereafter simply images 62, which also reside at the remote computer 58. The electronic document 60 and images 62 preferably are stored as files in a file system of the remote computer 52. The electronic document 60 may incorporate the images 62 using HTML tags that specify the location of files containing the images on the Internet 54. In alternative network protocol embodiments of the invention the electronic document 60 can have other structured document formats.

The browser on the computer 20 retrieves an electronic document 60 from its site, i.e., the web server 52 on the Internet 54, and displays the document on the computer screen or output device 30 (FIG. 1). To view the document 60, the user specifies a URL related to the particular document 60, such as by entering a URL character string with a keyboard, by selecting a hyperlink specifying the URL in an HTML document currently being displayed in the browser display 68, or by selecting a URL from a list provided by the browser. In response to the entered URL the browser generates a request command for the URL and transmits the request on the Internet 54 for the document 60 and the respective images 62 related to the document 60 using conventional Internet protocols, such as the Hypertext Transport Protocol (HTTP).

In a preferred embodiment, the browser utilizes a graphical interface, generating the rectangular viewing or display area 68 on the screen of the computer's output device 30 as is conventional in an operating system with a graphical user interface. The browser includes a frame 70 with graphical interface user controls (e.g. menu bar, scroll bars, buttons, etc.) which generally surrounds a document area 72 in the display 68. The user interface controls for the frame 70 can be activated by the user with the input device 28 to control the browser.

The browser displays the electronic document 60 that the user is currently viewing in the document display area 72. If the electronic document is too large to completely fit within the document area 72 the browser displays a portion of the document referred to hereafter as the "visible portion" in the document area 72 and presents the scroll bar 74 in the browser frame 70. The user can manipulate the scroll bar 74 with a mouse or other pointing device or input key commands on the keyboard to change the visible portion of the document that is shown by the browser within the document display area 72. The display 68 also comprises an address bar 75. The address bar displays the URL for the document 60 currently being displayed in document area 72.

Figure 3:
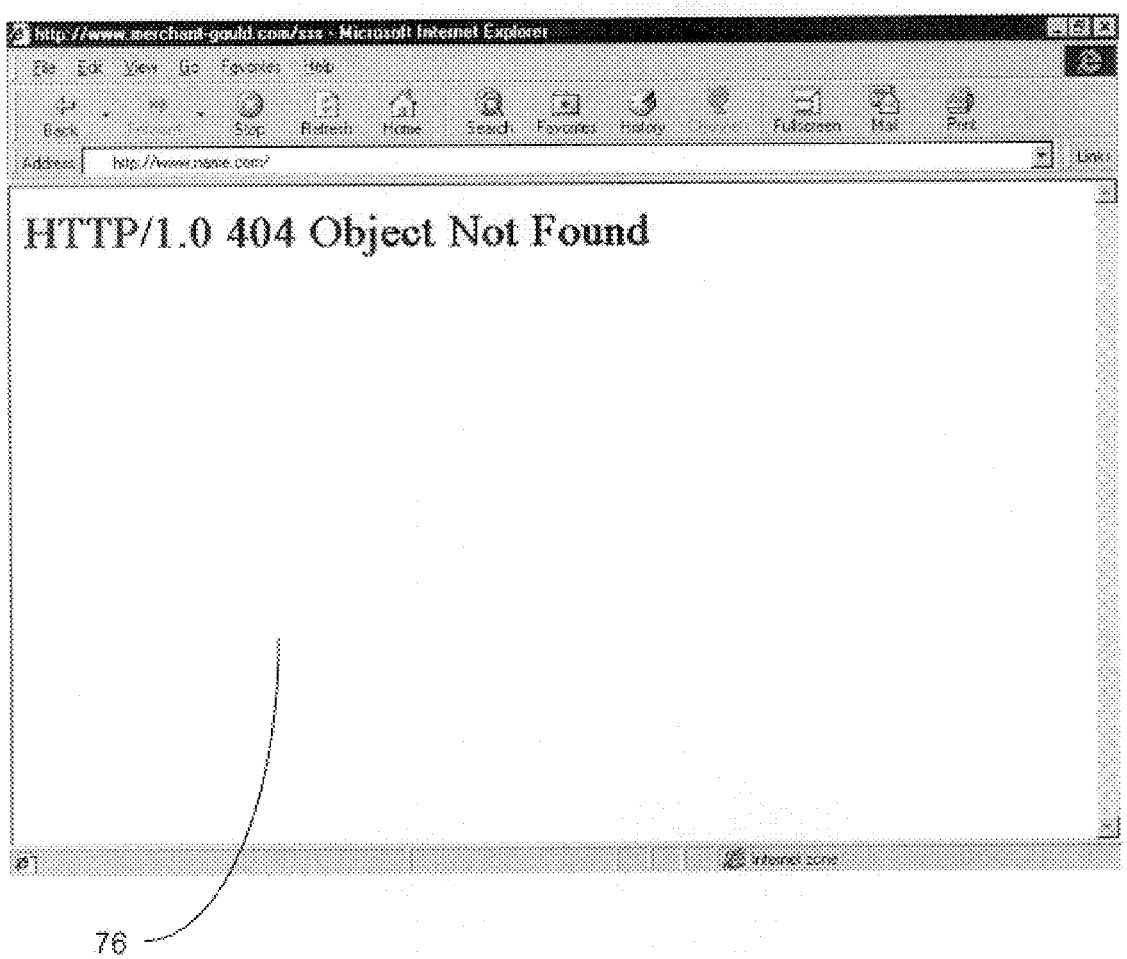
FIG. 3 is a reproduction of a sample error page returned by the web server shown in FIG. 2 wherein the page is determined to be unfriendly by the client system of the present invention.
Figure 4:
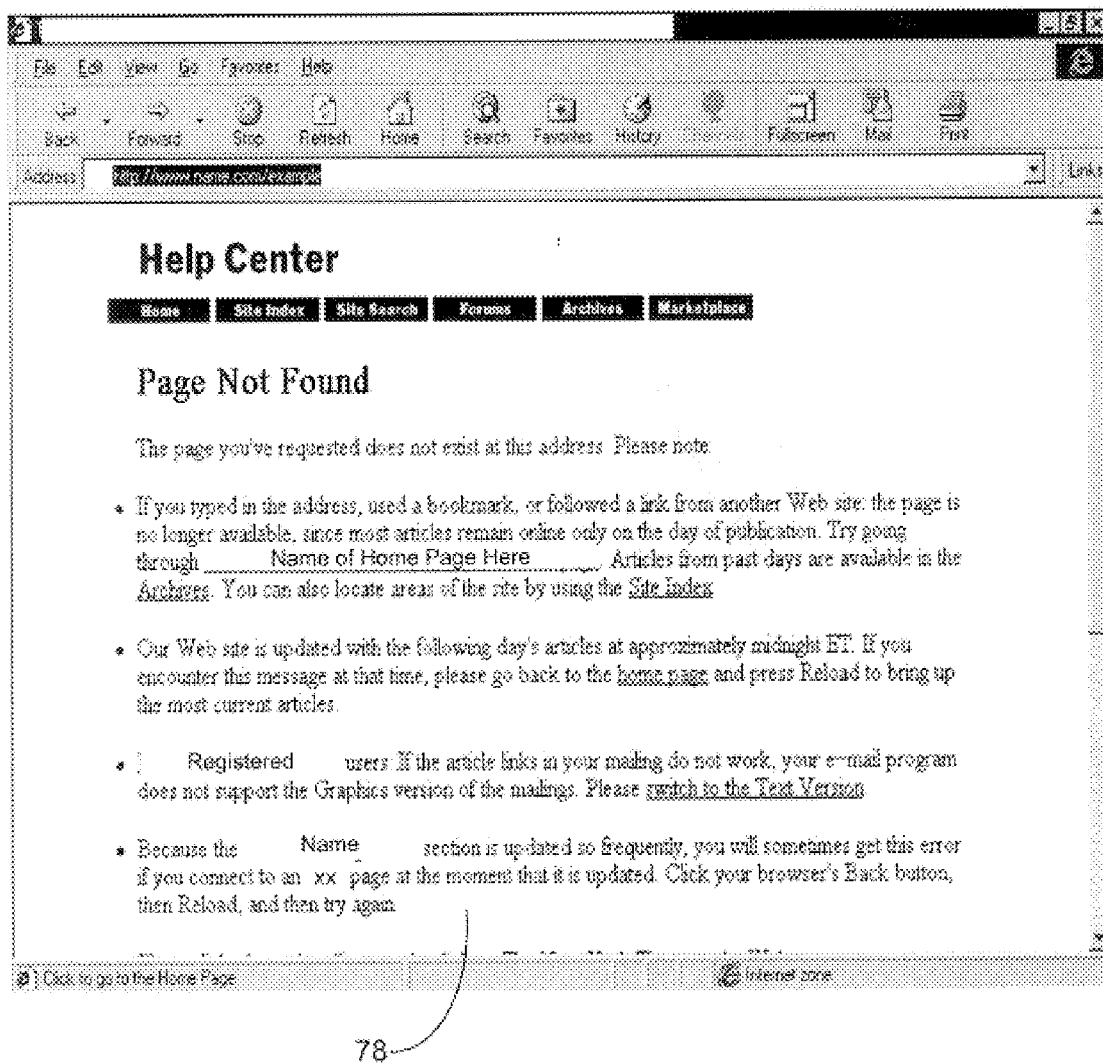
FIG. 4 is a reproduction of a sample error page returned by the web server shown in FIG. 2 wherein the page is determined to be friendly by the client system of the present invention.

Besides HTML documents for browsing, the network server 52 also has HTML documents 60 related to error messages. However, the web server may also incorporate error message documents not in HTML format. The electronic document 60 located at the web server 52 related to error messages may be either a non-friendly error message page or a friendly error message page. A non-friendly is a page that does nothing more than alert the user of an error. A non-friendly error page 76 that has been rendered and replicated is shown in FIG. 3. Similarly, a sample friendly error page 78, which provides more information to the user, that has been rendered and replicated is shown in FIG. 4. These pages can be displayed in the document viewing area 72 of the window 68 shown in FIG. 1. Importantly, the sample pages 76 and 79 in FIGS. 3 and 4 are pages or documents 60 that are retrieved from a web server 52. These pages are examples of current practices in communicating errors to the user.

Figure 5:
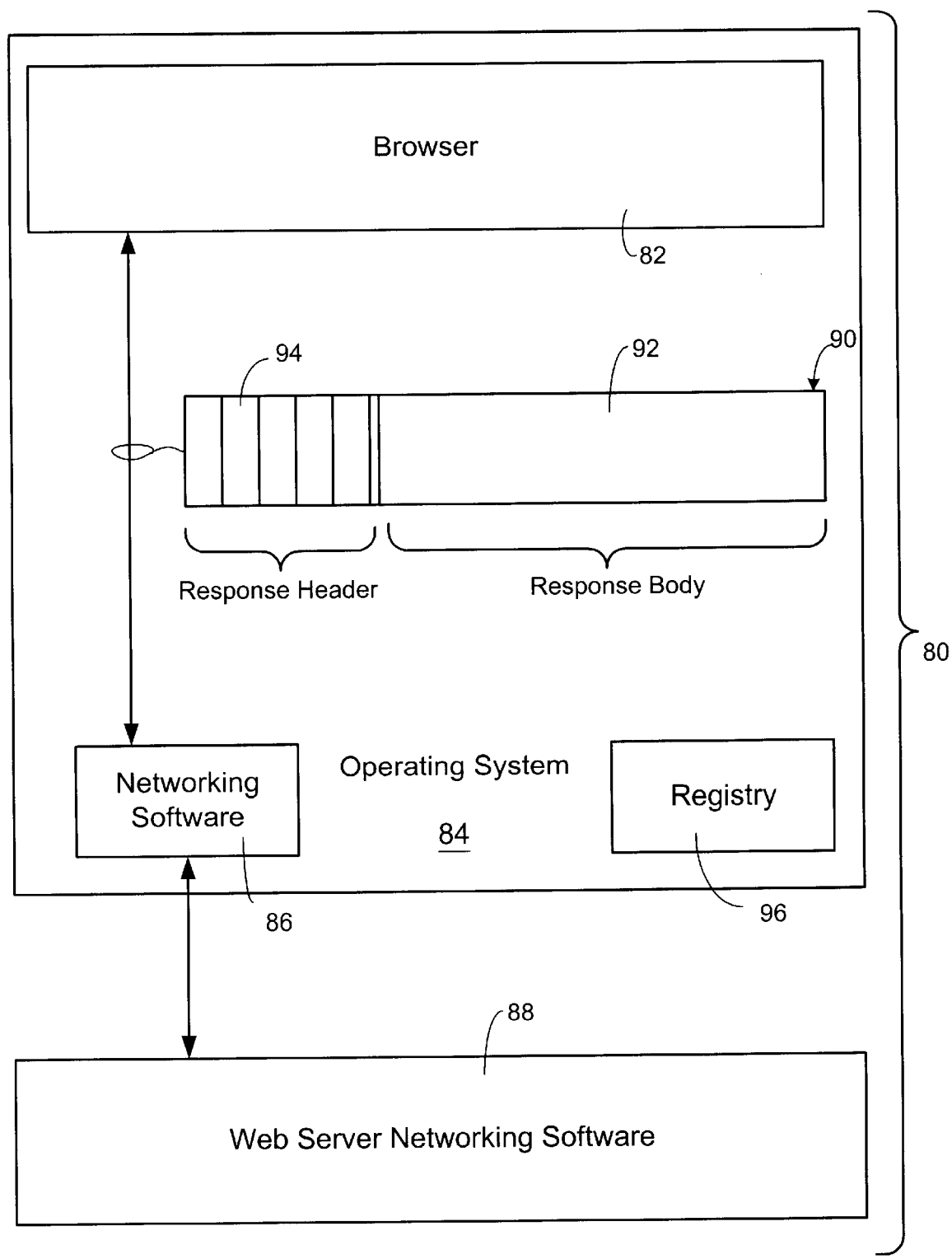
FIG. 5 is block diagram of a software environment comprising the client system of the present invention and a sample response returned to the client system shown in FIGS. 1 and 2 from the web server shown in FIG. 2.

A software operating environment, 80 shown in FIG. 5, within the client-server environment 50 (FIG. 2) includes a browser module 82 as part of the operating system 84. In a preferred embodiment, the browser 82 is integrated into the operating system 84 as shown in FIG. 5. Alternatively, the browser 82 could be a separate application which communicates with the operating system 84.

The operating system 84 also comprises networking software and device driver 86 which implements networking protocols for communicating on the Internet 54 thus indirectly with the network server software 88. For example, the operating system 84 in the illustrated embodiment may be Microsoft Corporation's Windows 98 operating system, which uses a remote network access subsystem, a TCP/IP network protocol drivers, and a network adapter driver as the networking software 86 for communicating on the Internet. The browser 82 communicates with the networking software 86 using a set of application programming interfaces (APIs) of operating system functions and services to retrieve the electronic document 60 from the web server 52 (FIG. 2).

Following a request for an electronic document 60, the browser module 82 receives a response 90 shown in FIG. 5 from the networking software module 86 related to the actual response communicated by the web server 52 (FIG. 2). The response 90 comprises both a body 92 and a header 94. If the request is satisfied, the body 92 comprises the actual electronic document 60 which was requested. Typically, if the request is for a web page comprising text, images and the like, then the body 92 is displayed by the browser 82 on the screen output device 30 (FIG. 1). If the request is not fulfilled due to an error occurring on the server, the response body 92 comprises an electronic text document 60 similar to either the page 76 (FIG. 3) or the page 78 (FIG. 4).

The response header 94 comprises information related to the response, such as the identification of the destination of the response, the origination of the response and the date of the response. Also, each response header 94 returned to the browser comprises a status code number related to the type of response. A successful, satisfactory or ratified request fulfilled by the server generates a header status code number in the 2xx series or class. A response header contains a status code number in either the 4xx or 5xx class when an error occurred in the server while attempting to satisfy the request as defined by the HTTP standards.

In the HTTP standards, client errors are listed under numbers 400–417, referred to as the "4xx class" of errors. The 4xx class of status codes is intended for cases in which an error is returned by the server, but the cause of the error is typically due to an error in the request from the client. The following is a brief list of the status code numbers for the 4xx class of errors identified in the HTTP standards along with their respective error titles and a short explanation of the probable source of the error.

400: Bad Request: The request could not be understood by the server due to improper syntax.

401: Unauthorized: The request requires authorization or additional authorization to be satisfied.

402: Payment Required: Although a valid code, the HTTP standards, as of Nov. 18, 1998 has labeled this code as reserved for future use.

403: Forbidden: The server understood the request, but refuses to satisfy the request.

404: Not Found: The server found nothing matching the requested URL.

405: Method Not Allowed: The method specified in the request is not allowed for the resource identified by the request.

406: Not Acceptable: The resource identified by the request is only capable of generating response entities which have content characteristics not acceptable according to the header information sent in the request.

407: Proxy Authentication Required: The client must first authenticate itself with the proxy.

408: Request Time-out: The client did not produce a request within the time that the server was prepared to wait.

409: Conflict: The request could not be completed due to a conflict with the current state of the resource. This code is used in situations where the server expects that the client might be able to resolve the conflict and resubmit the request.

410: Gone: The requested resource is no longer available at the server and no forwarding address is known.

411: Length Required: The server refuses to accept the request without a defined content length of the request message.

412: Precondition Failed: The precondition given in one or more of the request-header fields evaluated to false when it was tested on the server. This response is returned when the client provided some precondition information that prevents the return of the resource in cases when the resource does not satisfy the precondition.

413: Request Entity Too Large: The server is refusing to process a request because the request entity is larger than the server is willing or able to process.

414: Request-URI Too Long: The server is refusing to service the request because the request URL is longer than the server is willing to interpret.

415: Unsupported Media Type: The server is refusing to service the request because the entity of the request is in a format not supported by the requested resource for the requested method.

416: Requested Range Not Satisfiable: A server generally returns this response status code when a request included requested range information and none of these range values overlap the current extent of the selected resource.

417: Expectation Failed: An expectation given in the request could not be met by this server, or, if the server is a proxy, the server has unambiguous evidence that the request could not be met by the next-hop server.

Server errors are listed under the numbers 500–505 and are generated by the server when the server is aware that it has erred or is incapable of performing the request. These errors include the following:

500: Internal Server Error: The server encountered an unexpected condition which prevented it from fulfilling the request.

501: Not Implemented: The server does not support the functionality required to fulfill the request, e.g., the server does not recognize the request method.

502: Bad Gateway: The server, while acting as a gateway or proxy, received an invalid response from the upstream server it accessed in attempting to fulfill the request.

503: Service Unavailable: The server is currently unable to handle the request due to a temporary overloading or maintenance of the server.

504: Gateway Time-out: The server, while acting as a gateway or proxy, did not receive a timely response form the upstream server specified by the URI.

505: HTTP Version not Supported: The server does not support, or refuses to support, the HTTP protocol version that was used in the request message.

Logical Operations of Preferred Embodiments

Figure 6:
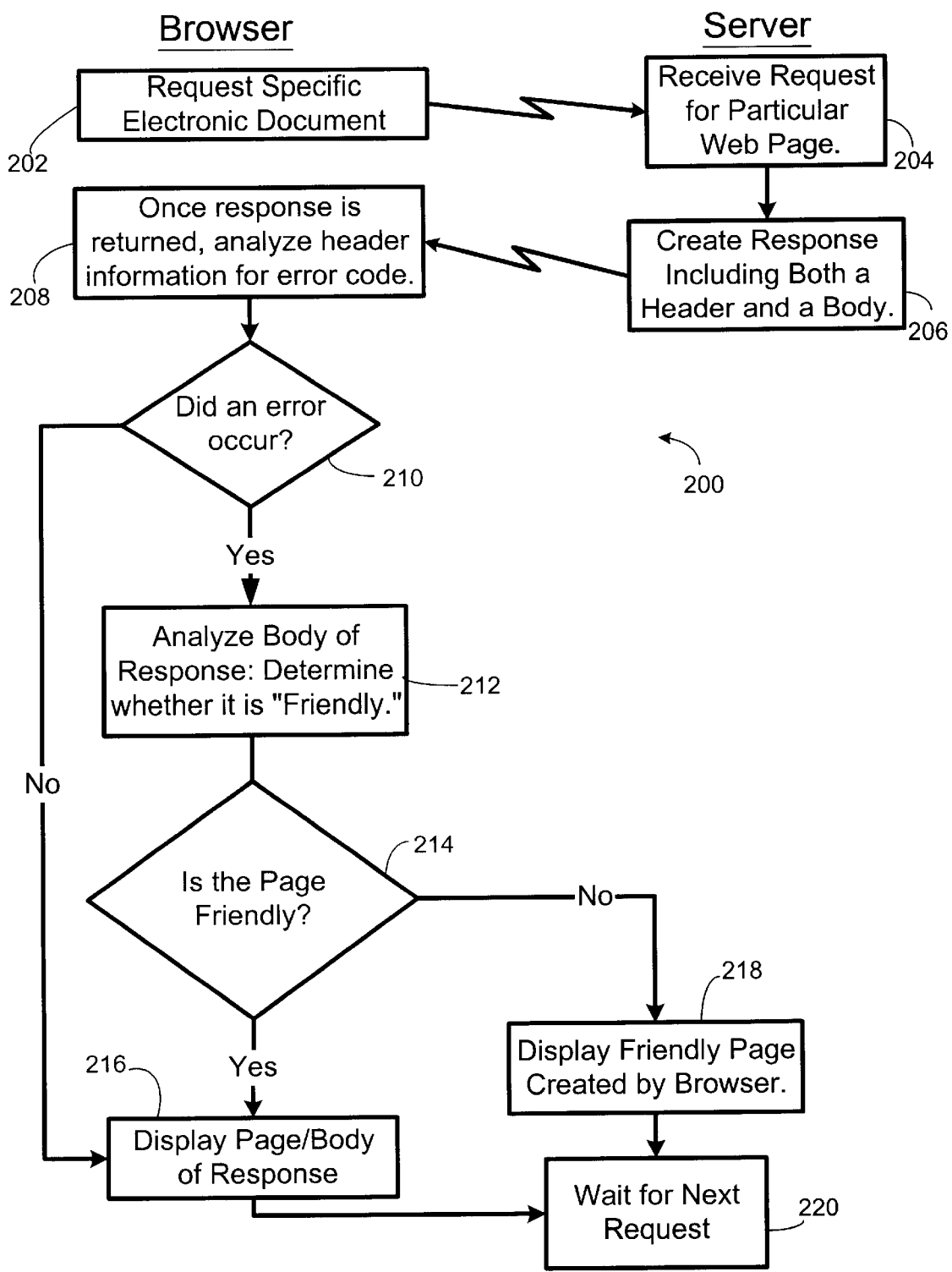
FIG. 6 is a flow chart depicting logical operations executed by the client system of the present invention.

In one embodiment of the present invention shown as a flow of logical operations in FIG. 6, the browser module 82 begins with a request operation 202. Operation 202 communicates the request to the web server.

Operation 204 at the server receives the request from the browser. The web server, in module 206, creates a response to the particular request. If the request is satisfied by the server without error, the created response comprises the requested electronic document 60 (FIG. 2) in the body 92 (FIG. 5) of the response. The response header 94 (FIG. 5) also comprises a status code number indicating the request was successful. On the other hand, if the response can not be satisfied due to an error in the request or an error at the server, the server created response at module 206 comprises the appropriate error status code number in the header 94 (FIG. 5) and an error message page as the body 92 of the response 90. Module 206 sends the response to the browser.

Analysis module 208 receives the response from the server. As part of module 208, the information received from the server is passed to the networking software module 86 of the network client computer system. This underlying, lower-level communications application receives the information in packets, recombines the packets into a legible response 90 (FIG. 5) and returns the complete response to the browser module 82. The response 90 contains both the header information 94 and the body 92 which makes up an electronic document or page 60.

Following the receipt of the response from the server, modules 208–214 select the actual page that is to be displayed in the document viewing area 72 (FIG. 2). Initially, the analysis operation 208 analyzes the response header. Decision operation 210 detects, from the analysis operation 208, whether an error occurred in the server. The decision 210 detects errors by comparing information in the response header to predetermine information related to known error conditions. Preferably, the header contains this information in the form of a status code number. If HTTP is used, then the server is required to incorporate the status code number in the response header. Thus, the analysis involves the direct comparison of the status code number returned in the response header to a list of predetermined error numbers resident in the browser. Comparing these numbers allows for a relatively high level determination of whether an error occurred at the server without analyzing the actual body of the response.

If decision operation 210 determines that an error occurred, then the browser operation 212 analyzes the body of the response to determine whether the response body is a friendly response. A friendly response includes a web page having sufficient information to aid the user in handling the error condition. The body analysis operation 212 compares the body of the response to predetermined data characteristics to ascertain whether the returned page is friendly. If it is determined that the response is friendly at decision 214, then display module 216 simply displays the body of the response.

If the body analysis operation 212 determines that the body of the response is unfriendly then the decision operation 214 causes the display operation 218 to display a friendly page instead of the body of the response. The friendly page displayed by operation 218 is created by the browser and is preferably an electronic document file resident on the computer 20. The page is specifically related to the error code status number returned in the header of the response. The end user views a more detailed error message which provides information related to the error that occurred and possible reasons why the error occurred as well as possible ways to avoid the error in the future. Following the display of either the response body or the browser created friendly page, the operating system is free to complete other tasks or wait for another request.

Figure 7:
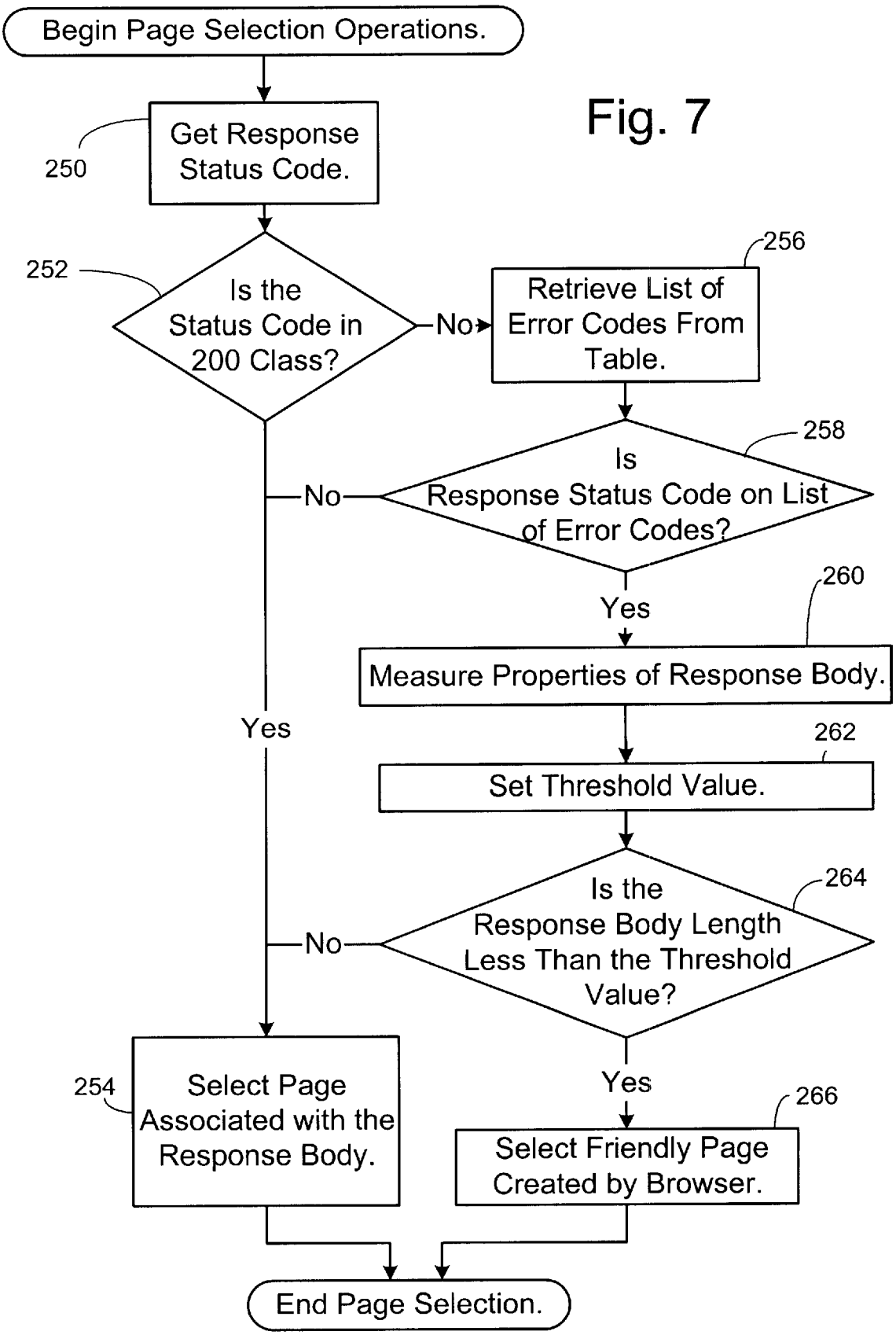
FIG. 7 is a flow chart depicting logical operations executed by a particular embodiment of the client system of the present invention.
Figure 8:
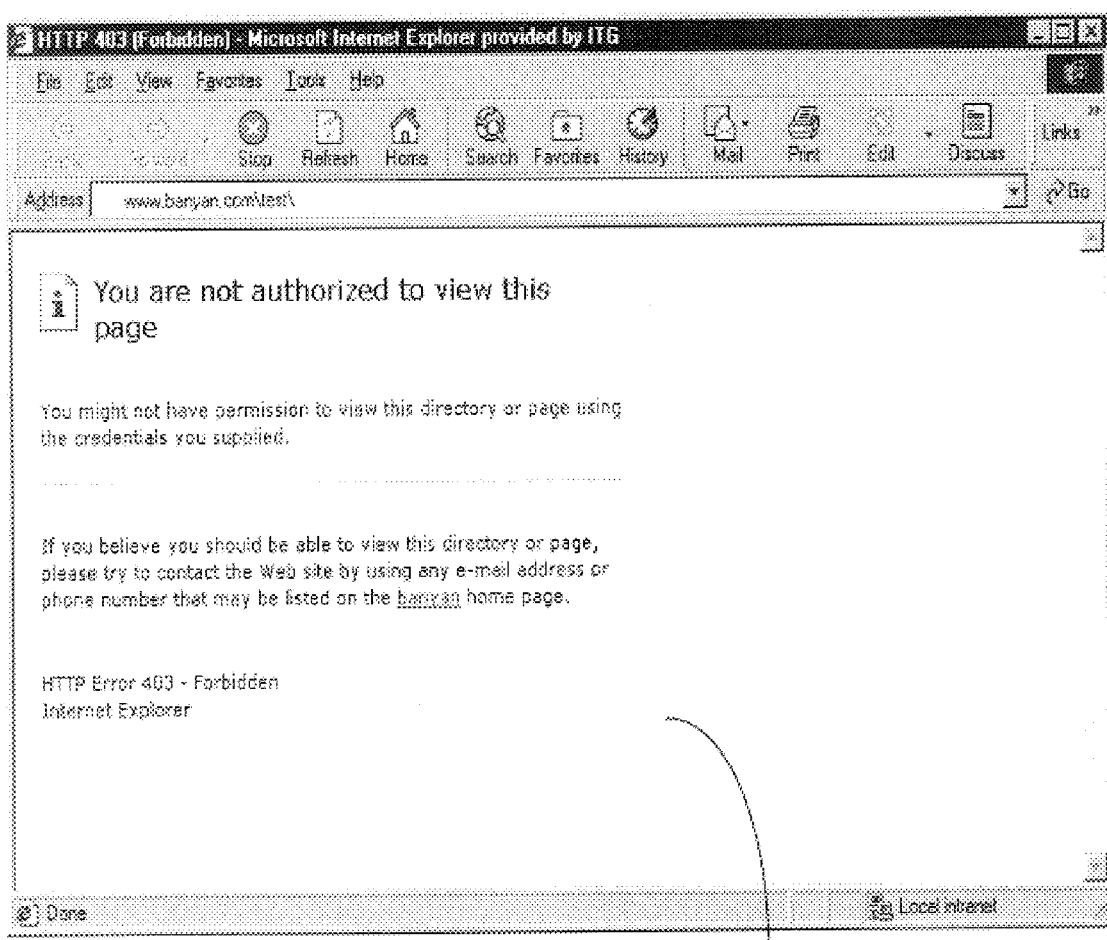
FIG. 8 is a reproduction of a sample error page displayed on the screen of the personal computer in FIGS. 1 and 2, the page being created by the client system of the present invention and displayed in substitution for an unfriendly error page.
Figure 9:
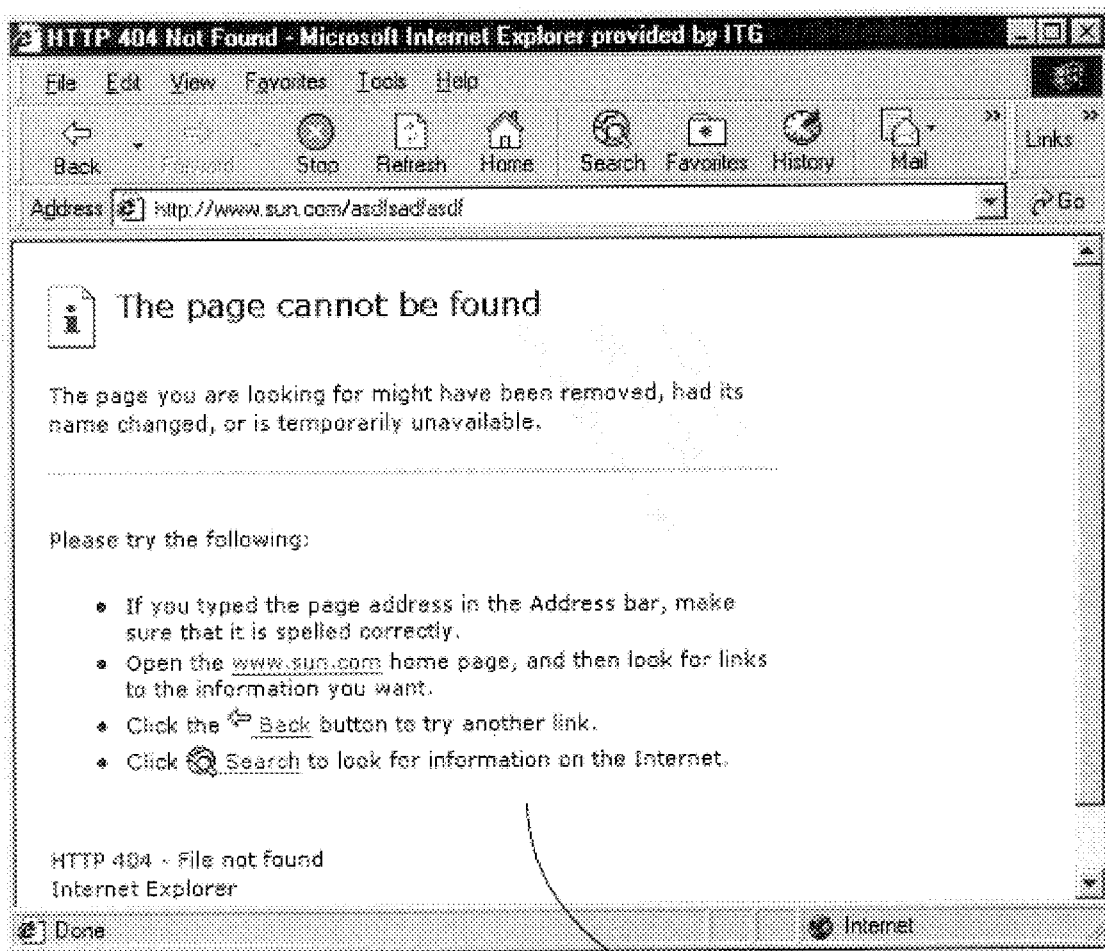
FIG. 9 is a reproduction of a sample error page displayed on the screen of the personal computer in FIGS. 1 and 2, the page being created by the client system of the present invention and displayed in substitution for an unfriendly error page such as the one shown in FIG. 3.
Figure 10:
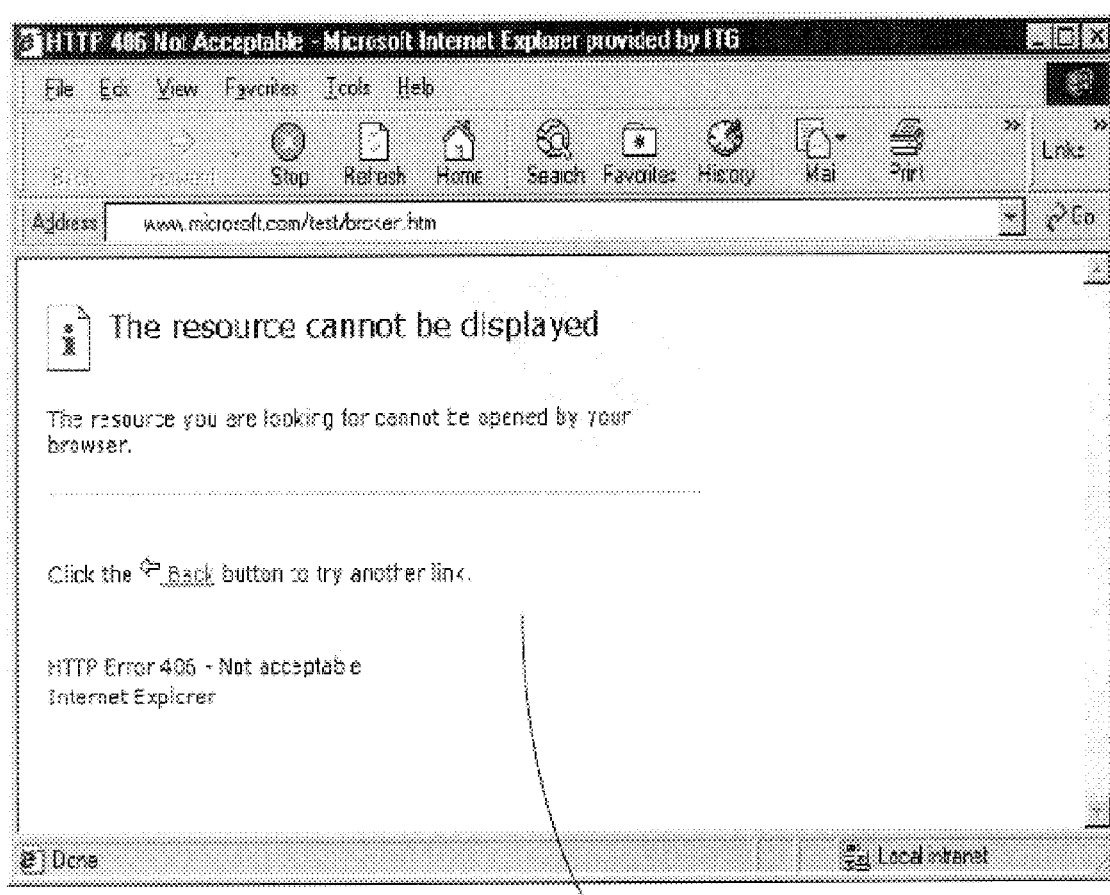
FIG. 10 is a reproduction of a sample error page displayed on the screen of the personal computer in FIGS. 1 and 2, the page being created by the client system of the present invention and displayed in substitution for an unfriendly error page.
Figure 11:
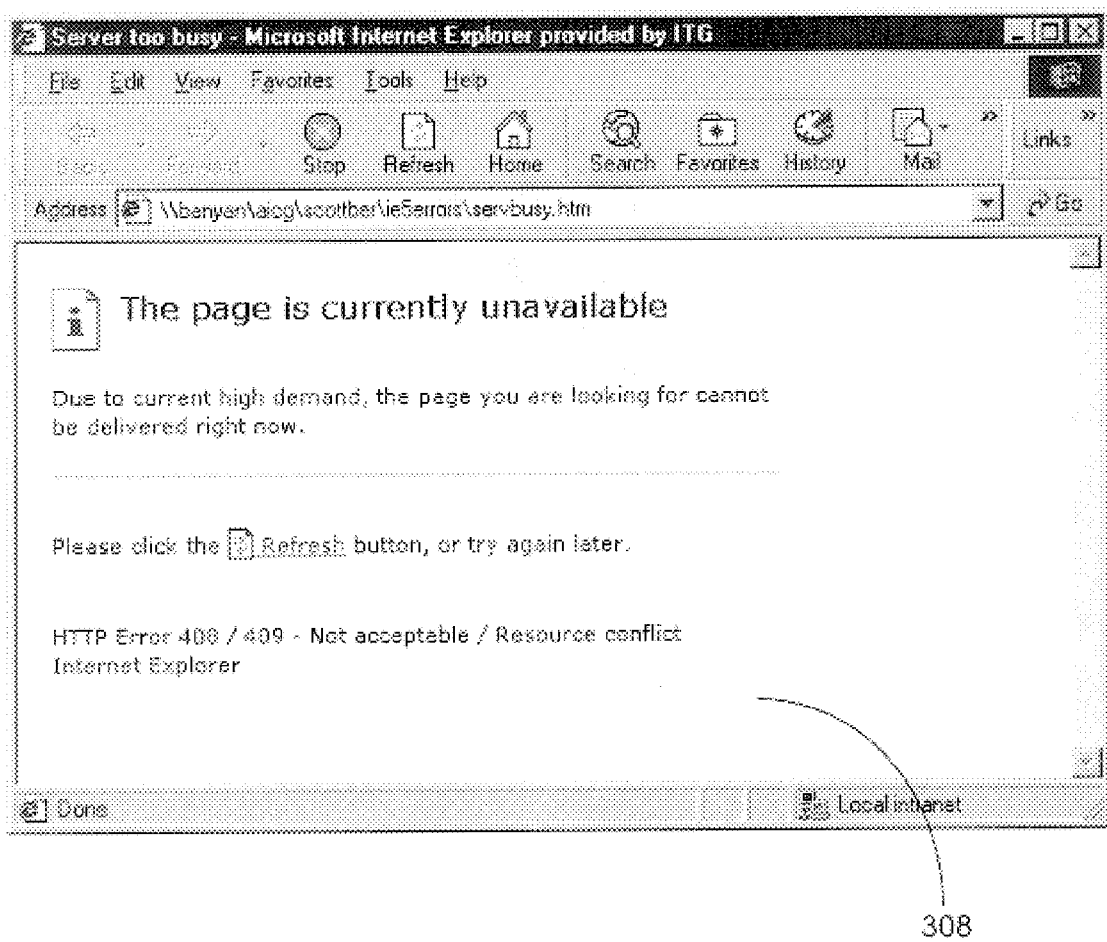
FIG. 11 is a reproduction of a sample error page displayed on the screen of the personal computer in FIGS. 1 and 2, the page being created by the client system of the present invention and displayed in substitution for an unfriendly error page.

In an embodiment of the present invention, the Internet protocol used is HTTP version 1.1, the logical operations related to the page selection process of this embodiment are shown in FIG. 7 and generally relate to the operations 208–214 described above with respect to FIG. 6. The page selection operations begin following the receipt of a response from the web server 52. Initially, the get operation 250 obtains the response status code. Since the protocol used with this environment is the HTTP version 1.1, the response header includes a number related to the status code. Obtaining the response code involves either making a request to the lower level networking software 86 which then returns the response code to the browser module 82. Alternatively, the browser itself can parse the header information and determine the response status code.

Once the status code is obtained by operation 250, the browser decision operation 252 then tests whether the status code is within the 2xx class of status codes. This test is made by comparing the response code to a list of 2xx class to see if it is one of these codes. Alternatively, the comparison can be done by simply comparing the first digit to the number 2. If the response status code is in the 2xx class, the operation flow branches YES from decision operation 252 to operation 254. This operation is similar to the analysis operation at modules 208 and 210 discussed above in connection with FIG. 6 wherein the specific information is analyzed. The response code 2xx class defined by HTTP version 1.1 outlines the various responses that may be returned by the server when the request was successfully filled.

In such a case no further analysis is necessary related to error messages. Thus, if the browser determines that no error occurred at the server, then the select operation 254 selects the response body as the page to be displayed. Once the response body is selected, then the operation flow is concluded, and the browser continues with other tasks such as displaying selected page and waiting for the next request from the user.

Should the test operation 252 determine that an error occurred at the server during the analysis of the status code information, then operation flow branches NO to retrieve operation 256 which gets a list of error codes from a data table. The data table comprises a predetermined list of error codes, each error code relating to an error which the browser has contemplated as possibly requiring a replacement page.

As discussed above, HTTP outlines approximately 22 different error codes related to many different errors. However, since some of the errors described above rarely occur if ever, the browser does not generate friendly error pages for all HTTP error codes because some of these pages would not be used but would consume memory and impair performance. The following table outlines the more common errors and provides the path to the replacement page:

| Error Code | File Name |
|---|---|
| 400 | http_400.htm |
| 403 | http_403.htm |
| 404 | http_404.htm |
| 405 | http_gen.htm |
| 406 | http_406.htm |
| 408 | servbusy.htm |
| 409 | servbusy.htm |
| 410 | http_410.htm |
| 500 | http_500.htm |
| 501 | http_501.htm |
| 505 | http_501.htm |

Once the list is retrieved from the data table, decision operation 258 determines whether the response error code is on the list of error codes. If the response error code is not on the list, then the browser has no friendly error message related to the error. In this situation, select operation 254 at the browser simply selects the response body as the page to be displayed.

If the error code is on the list of error codes then the browser has a friendly error page related to the error and a determination must be made as to whether to select the browser page or the page returned in the response body.

In order to make this determination, the measure properties module 260 analyzes the properties of the response body and produces a property value. Preferably the response is analyzed to determine the length of the response page which produces a length value. Alternatively, the response page may be analyzed for other criteria or characteristics that indicate whether the page is friendly. For example, the response page may be analyzed based on the number of hyperlinks or images in the page, the size and type of the page text or the type of software package used by the server computer in generating the response. Each alternative measurement produces a property value related to the response page.

Obtaining the length of the response body, in terms of bytes, preferably involves executing a command requesting the length value from the networking software 86 (FIG. 5). Since the networking software 86 compiled the various incoming packets related to the response, the networking software has stored specific information related to the response including the length of the body of the response. Alternatively, some response headers include the length of the response body and thus the information could be gleaned from the header directly. However, since some responses do not include this information, the networking software provides the length.

Once the length of the response body is determined by operation 260, operation 262 sets a predetermined threshold value. The threshold value is a number related to the expected length of the response body when the response length is measured by module 260. Since each error condition most likely causes the generation of differently sized error messages, operation 262 sets a threshold value related to the specific error code and independent of the other error codes. A threshold value is thus assigned for each error code condition providing greater flexibility in adjusting threshold values. The following are the preferred values related to the specified error codes:

| HTTP Version 1.1 Error Code | Threshold Length Value |
|---|---|
| 400 | 512 |
| 403 | 256 |
| 404 | 512 |
| 405 | 256 |
| 406 | 512 |
| 408 | 512 |
| 409 | 512 |
| 410 | 256 |
| 500 | 512 |
| 501 | 512 |
| 505 | 512 |

These values are preferably set according to sizes, in bytes, of existing response bodies containing unfriendly error messages. That is, the threshold size is set to be slightly larger than the largest known unfriendly error message while still being smaller than known friendly pages. Setting the threshold in this manner preferably allows known friendly error messages generated by the network server 52 to be displayed while not displaying unfriendly error messages.

In alternative embodiments that measure properties of the response page other than the length of the response, the threshold values are set in relation to these other property values. The set threshold values preferably prevent unfriendly pages from being selected for display while known friendly server pages may still be selected for display. Also, these threshold values based on other properties may be set according to the error codes.

The threshold values are stored in a registry 96 FIG. 5, also a part of the operating system 84. The registry is a data structure used by the operating system 84 to store various items. Since the values are kept in the registry 96, the values are do not consume memory allocated to the browser. Additionally, placing these values in the registry provides greater flexibility in adjusting the values. For instance, a user may want to adjust the threshold values to allow certain unfriendly error messages to be displayed. In such a situation, the placement of the values in the registry allows the user to configure the threshold values as desired. Of course, the threshold values could be allocated elsewhere while still allowing the user to configure the values.

Upon receiving both the length of the response body and the threshold value for the specific error code, decision operation 264 (FIG. 7) compares the two values and determines whether the response body length is less than the threshold value. If the body length is not less than the threshold value, then select operation 254 selects the page returned in the response body. In this case, the browser has determined that although an error has occurred and that a browser-created, friendly error page is available, the response body is most likely a friendly error page that should be displayed. The browser assumes that since the returned page is friendly it probably provides more detailed information related to the error and therefore decision operation 264 branches the operation flow NO to select the returned page. Of course, the browser 82 could skip the analysis on the response body, but then friendly pages would not be selected. This may prohibit the best error page from being displayed.

If the response body length is less than the threshold value, the operation flow branches YES to select operation 266 which selects a browser created friendly page. The exact page that is selected is from the table above. Essentially when the match is made between the error code and the list from the table, the error message file associated with that error code is stored or marked for later use. Once it is decided that the message will be displayed, the file name is marked so that it can be displayed. Once a page is displayed with respect to a request, then the browser is finished and waits for the next request to be entered by the user.

In accordance with the preferred embodiments of the present invention, the browser has the capability to produce several unique pages 300, 302, 304 and 306 as shown in FIGS. 8, 9, 10 and 11. These pages are displayed as substitute pages in place of unfriendly error pages. Other pages (not shown) may be constructed and displayed as is known to those skilled in the art.

In displaying one of the pages 300, 302, 304 or 306, the browser navigates to the page URL. That is, the browser conducts a request similar to the network request that caused the error but instead of requesting a page located on a web server, the browser requests a page located in the memory resident on the computer system 20. The page is then rendered and displayed in the browser viewing area 72.

Creating the friendly error pages requires that a script in HTML be constructed in the usual manner. The HTML script incorporates text that is displayed on the screen and provides information related to the error that occurred and potential causes and probable techniques that may be used to avoid the error in the future. These HTML documents also incorporate hyperlinks that can be activated to navigate to safe URL. The browser assumes that the home page related to the web server that was initially accessed is a safe page and thus most error message pages incorporate a hyper link to the home page.

In order to create the hyperlink to the related home page, the HTML document comprises scripted code that parses the requested URL. In parsing the URL, the code searches for a first predetermined delimiter and disregards all information before the delimiter. Next, the code stores each element of the URL up to a second delimiter and disregards all information following the second delimiter. The information between the two delimiters is used to construct a URL which becomes the requested page should the hyperlink become activated. The constructed URL comprises all necessary information such as the proper protocol, delimiters, etc.

The information between the delimiters is also used to create a display code for the hyperlink. The display code displays the information in the form of a hyperlink. Preferably, the information between the delimiters is used as the hyperlink image.

Other hyperlinks are also incorporated that provide similar functions in an attempt to guide the user to a safe page. For example, the page may include a hyperlink which operates to navigate to the URL which was last displayed, similar to activating the "Back" control button in Microsoft Corporation's Internet Explorer Browser program. As another example, the friendly page may include a hyperlink that operates in a similar manner to the Internet Explorer Refresh option.

When a friendly page created by the browser is displayed in the area 72, the address bar 75, located near the top of the display area, displays the URL of the page requested from the web server 52. The browser of the present invention displays the requested URL even though the displayed document is a browser-created error page.

Figure 12:
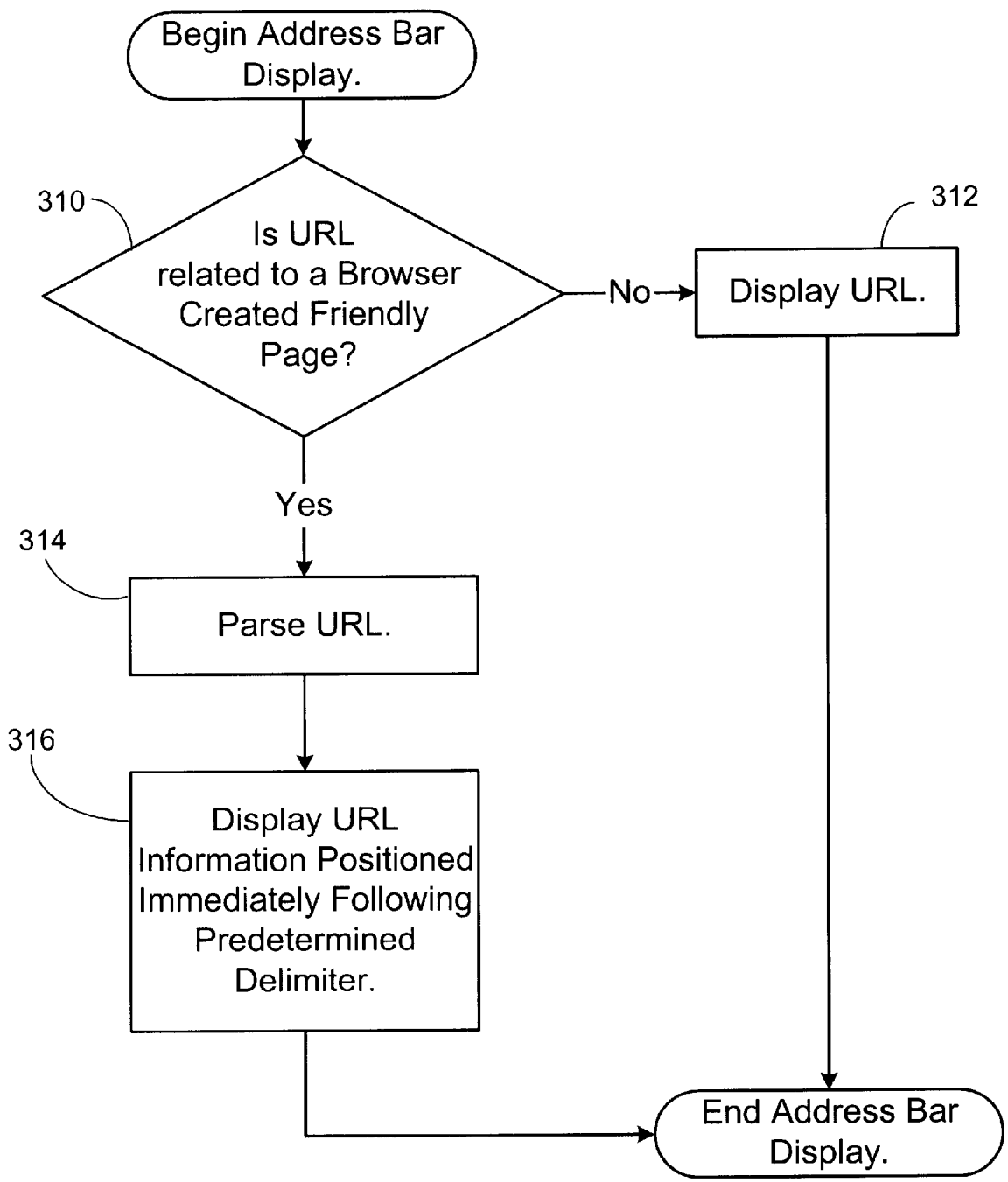
FIG. 12 is a flow chart depicting logical operations executed by the client system of the present invention in displaying information in an address bar display area.

The process of modifying the address bar contents is described in relation to FIG. 12 which is a flow chart of functional operations for the address bar display executed each time a page is displayed in the browser frame.

Initially, decision operation 310 determines if the URL related to the page display matches one of the URLs related to the browser created friendly pages. Decision operation 310 thus determines whether a replacement page has been selected for display by the browser. Although a direct comparison is made between the URL to be displayed and a list of browser created URLs, decision operation 310 may be accomplished by setting a flag or otherwise indicating the URL is a replacement page. If no replacement page is used, then the URL does not match any of the browser created URLs and thus operation 312 displays the URL for the page displayed in the browser viewing area 72.

If the URL matches one of the friendly URLs, then operation 314 parses the URL to determine the initial URL requested. This process may be accomplished by including in the request for the friendly browser page, as a parameter, the initially requested URL. As an example, the request may be of the following form: "res://shdoclc.dll/404.htm#http://www.request.com/file.htm" Wherein the portion of the command that precedes the "#" symbol is the requested friendly page URL. The portion of the request following the "#" symbol is the initially requested URL that returned the error. Passing the initial error URL with the request for the friendly page, allows the parse operation 314 to parse the newly requested URL and select only the URL information related to the initial error URL. Once the error URL is determined, the URL display operation 316 displays the error URL.

Displaying the error URL in the address bar 75 (FIG. 2) allows the user to immediately view the syntax and spelling of the URL entered which caused the error. Since many errors are related to these types of mistakes, the ability to quickly reference the error URL provides the user with necessary information related to correcting the returned error.

The friendly error pages 300, 302, 304 and 306 created and displayed by the browser of the present invention provide the user that encounters them information related to the error that occurred and how it may have happened. The pages also provide the information in a user friendly manner while giving the user several options or techniques by which the user can return to a safe page and avoid the error in the future. As the Internet becomes more popular, the user-friendly error pages provide beneficial guidance to those that would otherwise be overwhelmed by intimidation when faced with the unfriendly error pages.

In an alternative embodiment, the browser may be operated in a text only or non-graphical environment wherein the browser displays browser generated pages of text. The pages of text are considered to be more friendly than returned text error pages.

Presently preferred embodiments of the present invention and many of its improvements have been described with a degree of particularity. It will be understood by those skilled in the art that various other changes in the form and details may be made therein without departing from the spirit and scope of the invention.

What is claimed is:

1. A method of displaying friendly error messages on a client computer following an error occurrence, the client computer communicating with a server computer over a computer network, said method comprising the following steps:

receiving a response from the server wherein the response comprises a response page and an error indicator;

analyzing the error indicator of the response to detect whether an error occurred;

upon detection of an error, analyzing the response to determine whether the response page is friendly;

if the response page is friendly, displaying the response page;

if the response page is unfriendly, displaying a predetermined replacement friendly page;

wherein the step of analyzing the response to determine whether the response page is friendly further comprises the following steps:

measuring at least one predetermined property of the response page to generate a property value;

setting a threshold value;

comparing the property value to the threshold value; and determining whether the response page is friendly based on the comparison of the property value and the threshold value.

2. A method of displaying friendly error messages as defined in claim 1 wherein response page has a response body and the predetermined property is the length of the response body.

3. A method of displaying friendly error messages as defined in claim 1 wherein the predetermined property is a number of hyperlinks in the response page.

4. A method of displaying friendly error messages as defined in claim 1 wherein the predetermined property is a number of images in the response page.

5. A method of displaying friendly error messages as defined in claim 1 wherein the predetermined property is a version of software used by the server in generating the response.

6. An apparatus for providing a friendly error page to a client computing system in a network of server and client computing systems, said apparatus operating in a browser at a client station, said browser sending page requests to the server and the server responding with a response page and response type information, said apparatus comprising:

a type analysis module analyzing the response type information for an error indication;

a test module detecting the response type information indicated an error;

a body analysis module responsive to the error for analyzing the body of the response page to determine if the response page is a friendly error page;

a select module selecting the response page if the response page is friendly and selecting a generated friendly error page if the response page is not friendly; and wherein said body analysis module comprises:

a measure module measuring one or more properties of the response page and creating a measured value; and a comparison module comparing the measured value to a predetermined threshold value and indicating whether the response page is a friendly error page.

7. The apparatus of claim 6 wherein said body analysis module further comprises:

a set module setting the predetermined threshold value based on the properties of the response page being measured by said measure module.

8. The apparatus of claim 6 wherein said body analysis module further comprises:

a set module setting the predetermined threshold value based on a status code.

9. The apparatus of claim 6 wherein said select module comprises:

detection module detecting whether or not the body analysis module determined the response page was a friendly error page;

a response page module responsive to the detection module and displaying the response page when the response page is a friendly error page; and a created page module responsive to the detection module and displaying a generated friendly error page when the response page is not a friendly error page.

10. A computer data signal embodied in a carrier wave readable by a computing system and encoding a computer program of instructions for executing a computer process for providing a friendly error page to a client computing system in a network of server and client computing systems, said computer process comprising:

sending page requests to a server;

receiving a response page and status information from the server;

analyzing the status information and detecting an error code indicating the response page is an error page;

if an error code is detected, analyzing the response page to determine if the response page is a friendly error page;

selecting the response page if the response page is friendly and selecting a created friendly error page if the response page is not friendly;

wherein the act of analyzing the response page comprises:

measuring at least one property of the response page and creating a measured value; and comparing the measured value to a predetermined threshold value and indicating whether the response page is a friendly error page.

11. The computer data signal of claim 10 wherein said computer process further comprises:

setting the predetermined threshold value based on the response page properties measured by said measuring act.

* * * * *